United States Patent
Britto et al.

(10) Patent No.: US 11,093,248 B2
(45) Date of Patent: Aug. 17, 2021

(54) PREFETCH QUEUE ALLOCATION PROTECTION BUBBLE IN A PROCESSOR

(71) Applicant: International Business Machines Corporation, Armonk, NY (US)

(72) Inventors: Vivek Britto, Austin, TX (US); Mohit Karve, Austin, TX (US); George W. Rohrbaugh, III, Charlotte, VT (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 16/125,974

(22) Filed: Sep. 10, 2018

(65) Prior Publication Data
US 2020/0081714 A1    Mar. 12, 2020

(51) Int. Cl.
*G06F 9/38* (2018.01)
*G06F 12/0862* (2016.01)

(52) U.S. Cl.
CPC ........ *G06F 9/3802* (2013.01); *G06F 12/0862* (2013.01)

(58) Field of Classification Search
CPC ......... G06F 12/0862; G06F 2212/6026; G06F 9/30047; G06F 9/3802; G06F 9/3814; G06F 9/383; G06F 9/3455
See application file for complete search history.

(56) References Cited

U.S. PATENT DOCUMENTS

| 6,070,230 | A  | * | 5/2000  | Capps  | G06F 9/383    |
|           |    |   |         |        | 711/137       |
| 6,571,318 | B1 | * | 5/2003  | Sander | G06F 12/0862  |
|           |    |   |         |        | 711/137       |
| 6,976,147 | B1 | * | 12/2005 | Isaac  | G06F 12/0862  |
|           |    |   |         |        | 711/137       |
| 8,949,522 | B1 | * | 2/2015  | Garg   | G06F 13/385   |
|           |    |   |         |        | 711/113       |

(Continued)

FOREIGN PATENT DOCUMENTS

EA        2372560 B1    5/2018

OTHER PUBLICATIONS

Y. Ishii, M. Inaba, and K. Hiraki. Access Map Pattern Matching for High Performance Data Cache Prefetch. The Journal of Instruction-Level Parallelism, 24 pages, Jan. 2011. (Year: 2011).*

(Continued)

*Primary Examiner* — Keith E Vicary
(74) *Attorney, Agent, or Firm* — Scully, Scott, Murphy & Presser, P C.

(57) ABSTRACT

A computer system, processor, and method for processing information is disclosed that includes allocating a prefetch stream; providing a protection bubble to a plurality of cachelines for the allocated prefetch stream; accessing a cacheline; and preventing allocation of a different prefetch stream if the accessed cacheline is within the protection bubble. The system, processor and method in an aspect further includes providing a safety zone to a plurality of (Continued)

cachelines for the allocated prefetch stream, and advancing the prefetch stream if the accessed cacheline is one of the plurality of cachelines in the safety zone. In an embodiment, the number of cachelines within the safety zone is less than the number of cachelines in the protection bubble.

20 Claims, 9 Drawing Sheets

(56) References Cited

U.S. PATENT DOCUMENTS

| | | | | |
|---|---|---|---|---|
| 9,311,247 | B1* | 4/2016 | Schuttenberg | G06F 12/0862 |
| 9,442,861 | B2 | 9/2016 | McCormick, Jr. | |
| 9,672,154 | B1* | 6/2017 | Hsu | G06F 12/0862 |
| 2002/0087802 | A1* | 7/2002 | Al-Dajani | G06F 9/3832 |
| | | | | 711/137 |
| 2006/0248280 | A1* | 11/2006 | Al-Sukhni | G06F 9/30047 |
| | | | | 711/137 |
| 2008/0288751 | A1* | 11/2008 | Kocev | G06F 9/3455 |
| | | | | 712/207 |
| 2009/0216956 | A1* | 8/2009 | Ekanadham | G06F 12/0862 |
| | | | | 711/137 |
| 2010/0268893 | A1* | 10/2010 | Luttrell | G06F 12/0862 |
| | | | | 711/137 |
| 2011/0238923 | A1* | 9/2011 | Hooker | G06F 12/0862 |
| | | | | 711/137 |
| 2012/0054448 | A1* | 3/2012 | Thompson | G06F 12/0862 |
| | | | | 711/137 |
| 2012/0054449 | A1* | 3/2012 | Hu | G06F 12/0862 |
| | | | | 711/137 |
| 2014/0059299 | A1* | 2/2014 | Durbhakula | G06F 12/0862 |
| | | | | 711/137 |
| 2015/0026413 | A1* | 1/2015 | Meier | G06F 12/0862 |
| | | | | 711/137 |
| 2015/0356014 | A1* | 12/2015 | Sathish | G06F 12/0862 |
| | | | | 711/3 |
| 2017/0090935 | A1 | 3/2017 | Falsafi et al. | |
| 2017/0091104 | A1* | 3/2017 | Rafacz | G06F 12/0862 |
| 2017/0168946 | A1* | 6/2017 | Wang | G06F 12/0862 |
| 2018/0018266 | A1* | 1/2018 | Jones, III | G06F 12/0862 |
| 2018/0137056 | A1 | 5/2018 | Bean | |

OTHER PUBLICATIONS

Akanksha Jain and Calvin Lin. Linearizing irregular memory accesses for improved correlated prefetching. In Proceedings of the 46th Annual IEEE/ACM International Symposium on Microarchitecture (MICRO-46). Association for Computing Machinery, New York, NY, USA, 247-259. (Year: 2013).*

Sparsh Mittal. A Survey of Recent Prefetching Techniques for Processor Caches. ACM Comput. Surv. 49, 2, Article 35 (Aug. 2016), 37 pages. (Year: 2016).*

* cited by examiner

| X - 5Y | X - 4Y | X - 3Y | X - 2Y | X - Y | X | X + Y | X + 2Y | X + 3Y | X + 4Y |
|---|---|---|---|---|---|---|---|---|---|
| ○ | ⊗ | ⊗ | ⊗ | ⊗ | ● | ⊖ | ⊖ | ⊗ | ○ |

| X - 6Y | X - 5Y | X - 4Y | X - 3Y | X - 2Y | X - Y | X | X + Y | X + 2Y | X + 3Y |
|---|---|---|---|---|---|---|---|---|---|
| ○ | ⊗ | ⊗ | ⊗ | ⊗ | ⊗ | ● | ⊖ | ⊖ | ○ |

| X - 3Y | X - 2Y | X - Y | X | X + Y | X + 2Y | X + 3Y | X + 4Y | X + 5Y | X + 6Y |
|---|---|---|---|---|---|---|---|---|---|
| ○ | ⊗ | ⊗ | ● | ⊖ | ⊖ | ⊗ | ⊗ | ⊗ | ○ |

| X - 4Y | X - 3Y | X - 2Y | X - Y | X | X + Y | X + 2Y | X + 3Y | X + 4Y | X + 5Y |
|---|---|---|---|---|---|---|---|---|---|
| ○ | ⊗ | ⊗ | ⊗ | ● | ⊖ | ⊖ | ⊗ | ⊗ | ○ |

● - Next Expected Cachelines
⊖ - Confirm-allowed Cachelines
⊗ - Allocate-prevented Cachelines
○ - Cachelines outside protection bubble

Fig. 8

| X - 5Y | X - 4Y | X - 3Y | X - 2Y | X - Y | X | X + Y | X + 2Y | X + 3Y | X + 4Y |
|---|---|---|---|---|---|---|---|---|---|
| ○ | ⊗ | ⊗ | ⊖ | ⊖ | ● | ⊗ | ⊗ | ⊗ | ○ |

| X - 6Y | X - 5Y | X - 4Y | X - 3Y | X - 2Y | X - Y | X | X + Y | X + 2Y | X + 3Y |
|---|---|---|---|---|---|---|---|---|---|
| ○ | ⊗ | ⊗ | ⊗ | ⊖ | ⊖ | ● | ⊗ | ⊗ | ○ |

| X - 3Y | X - 2Y | X - Y | X | X + Y | X + 2Y | X + 3Y | X + 4Y | X + 5Y | X + 6Y |
|---|---|---|---|---|---|---|---|---|---|
| ○ | ⊖ | ⊖ | ● | ⊗ | ⊗ | ⊗ | ⊗ | ⊗ | ○ |

| X - 4Y | X - 3Y | X - 2Y | X - Y | X | X + Y | X + 2Y | X + 3Y | X + 4Y | X + 5Y |
|---|---|---|---|---|---|---|---|---|---|
| ○ | ⊗ | ⊖ | ⊖ | ● | ⊗ | ⊗ | ⊗ | ⊗ | ○ |

● - Next Expected Cachelines
⊖ - Confirm-allowed Cachelines
⊗ - Allocate-prevented Cachelines
○ - Cachelines outside protection bubble

Fig. 9

PREFETCH QUEUE ALLOCATION PROTECTION BUBBLE IN A PROCESSOR

BACKGROUND OF INVENTION

The present invention generally relates to information handling and data processing systems, processors, and more specifically to prefetch units in processors.

Modern information and data handling systems often execute instructions out of order to achieve greater processing efficiency. Such processors typically are "pipelined" and have multiple elements which operate in parallel to process multiple instructions in a single processing cycle. Pipelining involves processing instructions in stages, so that the pipelined stages may process a number of instructions concurrently.

Typically the processor includes a number of stages, and the various stages may include an "instruction fetch" stage where an instruction is fetched from memory. In a "decode" stage, the instruction is decoded into different control bits, which in general designate (i) a type of functional unit (e.g., execution unit) for performing the operation specified by the instruction, (ii) source operands for the operation, and (iii) destinations for results of the operation. In a "dispatch" stage, the decoded instruction is dispatched to an issue queue (ISQ) where instructions wait for data and an available execution unit. Next, an instruction in the issue queue (ISQ) typically is issued to an execution unit in an "execution" stage. The "execution" stage processes the operation as specified by the instruction. Executing an operation specified by an instruction typically includes accepting data, e.g., one or more operands, and producing one or more results. There are usually register files and queues associated with the execution units and/or the issue queue (ISQ) to hold data, information, and/or instructions for the execution units.

In modern computer architecture, there are several known ways to design a computer adapted to perform more than one instruction at a time, or at least in the same time frame. For example, such a computer may include more than one processor core (i.e., central processing unit) and each processor core may be capable of acting independently of other processor cores. This may allow for true multitasking, with each processor core processing a different instruction stream in parallel with the other processor cores of the computer. Another design to improve throughput may be to include multiple hardware threads within each processor core, with the threads sharing certain resources of the processor core. This may allow each processor core to take advantage of thread-level parallelism. To handle multiple threads in each processor core, a processor core may have multiple execution slices. An execution slice may refer to a set of data processing circuitry or hardware units connected in series within a processor core. An execution slice may be a pipeline or pipeline-like structure. Multiple execution slices may be used as part of simultaneous multi-threading within a processor core.

SUMMARY

The summary of the disclosure is given to aid understanding of a computer system, computer architectural structure, processor, prefetch units and queues, and method of using prefetch units and queues in a processor, and not with an intent to limit the disclosure or the invention. The present disclosure is directed to a person of ordinary skill in the art. It should be understood that various aspects and features of the disclosure may advantageously be used separately in some instances, or in combination with other aspects and features of the disclosure in other instances. Accordingly, variations and modifications may be made to the computer system, the architectural structure, processor, prefetch units and queues, and their method of operation to achieve different effects.

In one or more embodiments a method of processing data in a processor is disclosed, the method including allocating a prefetch stream; providing a protection bubble to a plurality of cachelines for the allocated prefetch stream; accessing a cacheline; and preventing allocation of a different prefetch stream if the accessed cacheline is within the protection bubble. The method in an aspect further includes remaining on a next expected cacheline in the allocated prefetch stream in response to the accessed cacheline being within the protection bubble. The method preferably includes accessing data of a specified instruction stream, and preventing allocation of a new prefetch stream if the accessed data is within the plurality of the cachelines within the protection bubble. The protection bubble in an embodiment includes a plurality of cachelines in proximity to the next expected cacheline. The method in an aspect further includes providing a safety zone to a plurality of cachelines for the allocated prefetch stream, and advancing the prefetch stream if the accessed cacheline is one of the plurality of cachelines in the safety zone, where in an embodiment the plurality of cachelines within the safety zone is less than the number of cachelines in the protection bubble.

In one or more embodiments a method of increasing the efficiency of a processor is disclosed where the method includes allocating a new prefetch stream; providing a safety zone to a plurality of cachelines for the allocated prefetch stream; advancing the prefetch stream in response to a next cacheline being one of the plurality of cachelines in the safety zone. The plurality of cachelines within the safety zone in an aspect includes a next expected cacheline, and two cachelines ahead of the next expected cacheline. The method preferably also includes providing a protection bubble to a region of cachelines for the allocated prefetch stream, and preventing a new stream from allocating if the accessed cacheline is within the protection bubble region of cachelines, and where the region of cachelines within the protection bubble preferably includes cachelines in addition to the plurality of cachelines within the safety zone.

In one or more embodiments a computer system for processing information is disclosed where the computer system includes at least one processor; and a Prefetch Unit for prefetching cachelines, where the at least one processor is configured and adapted to: allocate a prefetch stream; provide a protection bubble to a plurality of cachelines for the allocated prefetch stream; to access a cacheline; and prevent allocation of a second new prefetch stream in response to an accessed cacheline being within the plurality of cachelines within the protection bubble. The processor is further configured and adapted in an embodiment to provide a safety zone to a number of cachelines for the allocated prefetch stream, and to advance the allocated prefetch stream to the next expected cacheline in response to the accessed cacheline being within the plurality of cachelines within the safety zone.

BRIEF DESCRIPTION OF THE DRAWINGS

The various aspects, features and embodiments of the information handling system, computer system, computer architectural structure, processor, prefetch units and queues, and their method of operation will be better understood when read in conjunction with the figures provided. Embodiments are provided in the figures for the purpose of illustrating aspects, features and/or various embodiments of the computer system, computer architectural structure, processor, prefetch units and queues, and their method of operation, but the claims should not be limited to the precise arrangement, structures, features, aspects, embodiments, or devices shown, and the arrangements, structures, subassemblies, features, aspects, methods, processes, embodiments, and devices shown may be used singularly or in combination with other arrangements, structures, subassemblies, features, aspects, embodiments, methods and devices.

FIG. 8 is a block diagram of a protection bubble in accordance with an aspect of the disclosure.

FIG. 9 is a block diagram of a protection bubble in accordance with an aspect of the disclosure.

DETAILED DESCRIPTION

The following description is made for illustrating the general principles of the invention and is not meant to limit the inventive concepts claimed herein. In the following detailed description, numerous details are set forth in order to provide an understanding of the information handling system, computer system, computer architectural structure, processor, memory, execution units such as, for example, a load store unit (LSU), queues, or register files, and their method of operation, however, it will be understood by those skilled in the art that different and numerous embodiments of the computer system, computer architectural structure, processor, load store unit (LSU), prefetch queues, or register files, and their method of operation may be practiced without those specific details, and the claims and invention should not be limited to the embodiments, subassemblies, features, processes, methods, aspects, features or details specifically described and shown herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc. It must also be noted that, as used in the specification and the appended claims, the singular forms "a," "an" and "the" include plural referents unless otherwise specified.

The following discussion omits or only briefly describes conventional features of information processing systems, including processors and microprocessor systems and architecture, which are apparent to those skilled in the art. It is assumed that those skilled in the art are familiar with the general architecture of processors, and in particular with processors which operate in an out-of-order execution fashion, including multi-slice processors and their use of execution units such as load store units (LSUs) and prefetch queues. It may be noted that a numbered element is numbered according to the figure in which the element is introduced, and is typically referred to by that number throughout succeeding figures.

Figure 1:
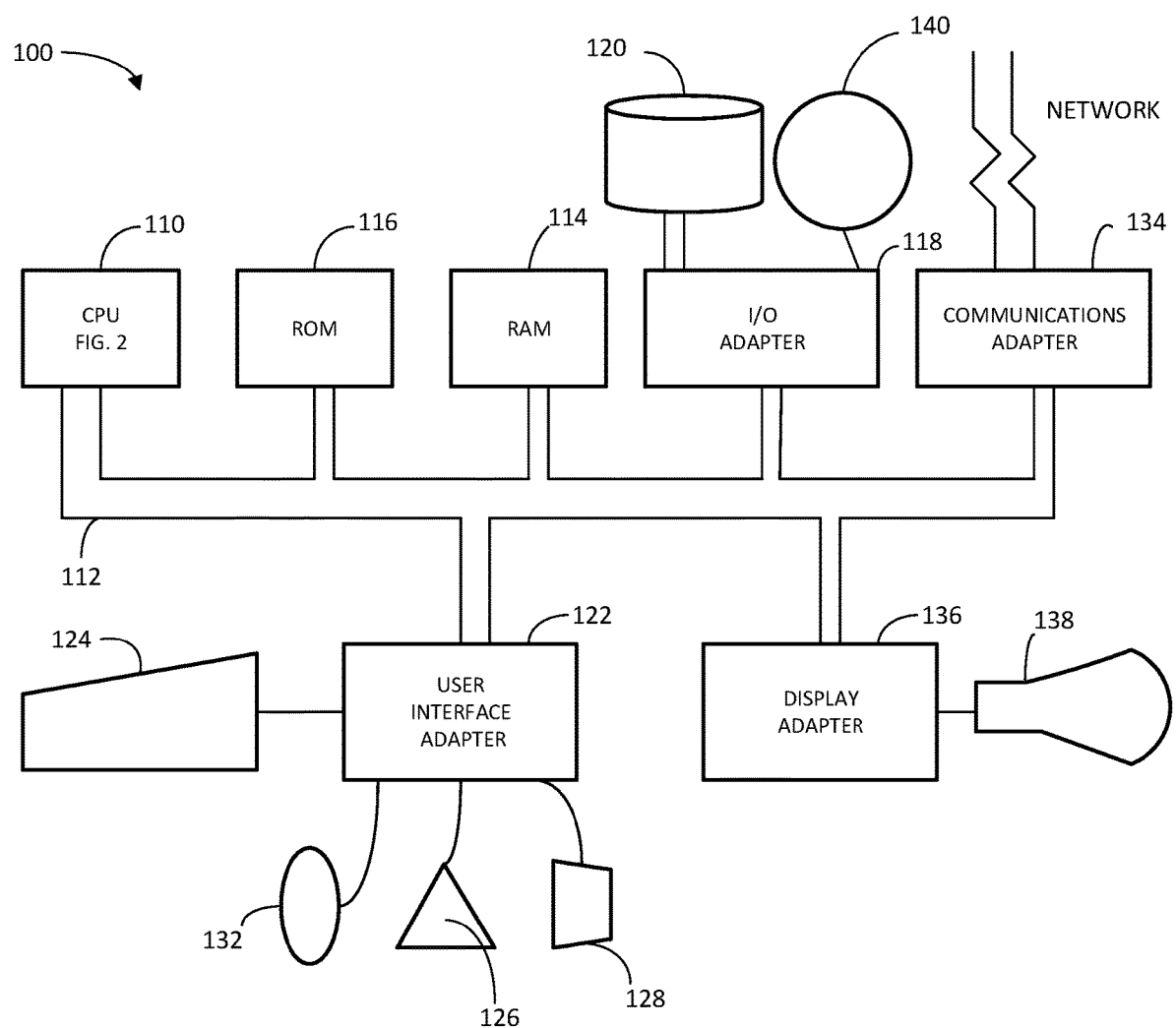
FIG. 1 illustrates an example of a data processing or information handling system in which aspects of the present disclosure may be practiced.

FIG. 1 illustrates an example of a data processing system 100 in which aspects of the present disclosure may be practiced. The system has a central processing unit (CPU) 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120 or other memory 140. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system through the keyboard 124, trackball 132 or mouse 126 and receiving output from the system via speaker 128 and display 138. Additionally, an operating system such as, for example, AIX ("AIX" is a trademark of the IBM Corporation) is used to coordinate the functions of the various components shown in FIG. 1.

The CPU (or "processor") 110 includes various logic units, functional units, registers, buffers, memories, and other units formed by integrated circuitry, and may operate according to reduced instruction set computing ("RISC") techniques. The CPU 110 processes according to processor cycles, synchronized, in some aspects, to an internal clock (not shown).

Figure 2:
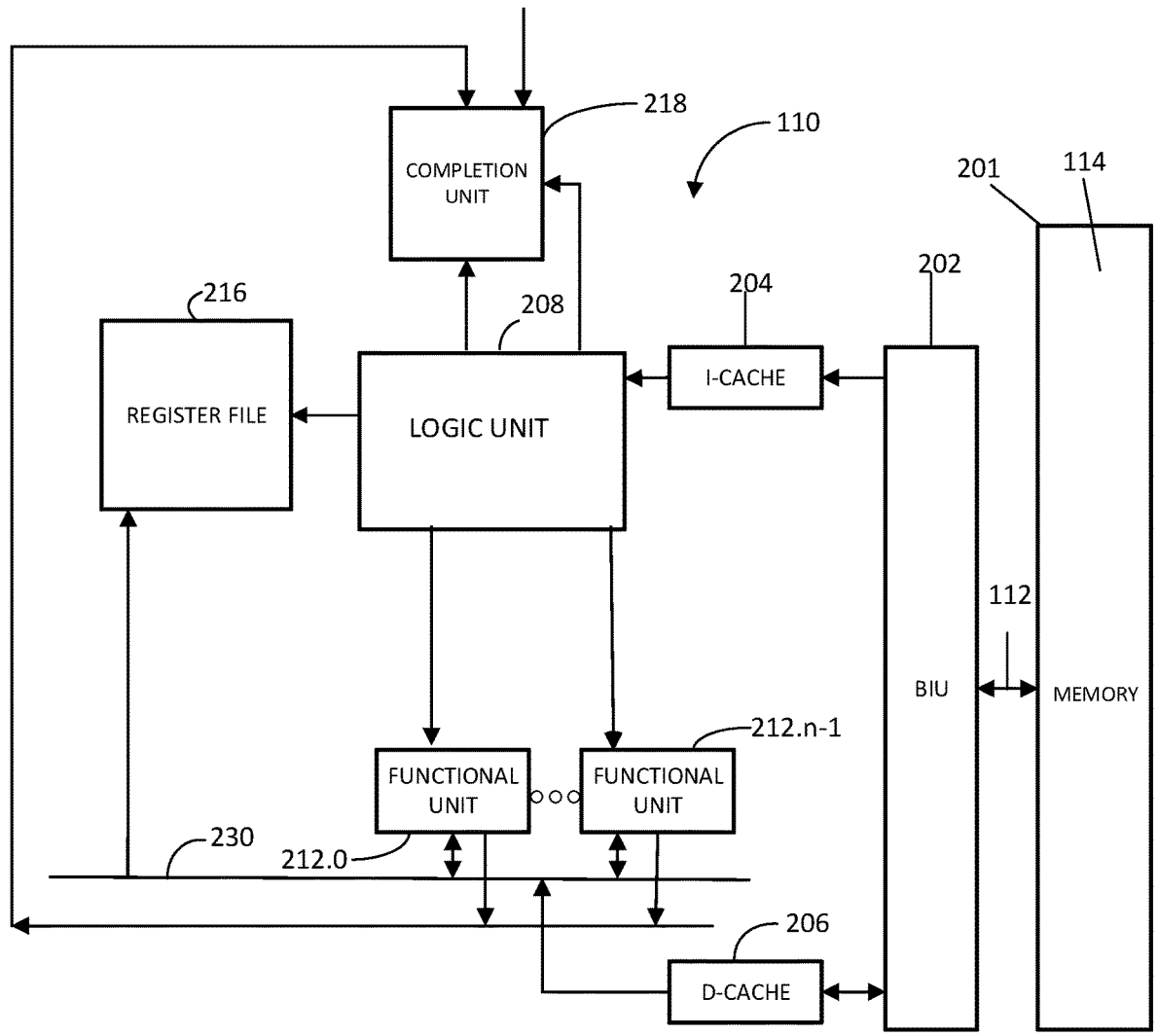
FIG. 2 illustrates a block diagram of a processor in which certain aspects of the present disclosure may be practiced.

FIG. 2 illustrates a block diagram of a processor 110 in which certain aspects of the present disclosure may be practiced. Processor 110 has a bus interface unit 202 coupled to the bus 112 for controlling transfers of data and instructions between memory 201, such as random access memory 114, and caches, e.g. instruction cache (I-Cache) 204 and data cache (D-Cache) 206. Data cache 206 and instruction cache 204 may each have various levels of cache such as, for example, L1 cache, L2 cache, and/or L3 cache.

Instructions may be processed in the processor 110 in a sequence of logical, pipelined stages. However, it should be understood that the functions of these stages may be merged together so that this particular division of stages should not be taken as a limitation, unless such a limitation is indicated in the claims herein. Indeed, some of the previously described stages are indicated as a single logic unit 208 in FIG. 2 for the sake of simplicity of understanding, and further detail as relevant will be provided below.

Logic unit 208 in FIG. 2 includes fetch, branch processing, instruction buffer, decode and dispatch units. The logic unit 208 fetches instructions from instruction cache 204 into the instruction buffer, either based on a normal sequence of the instructions or, in the case of a sequence having a conditional branch instruction, a predicted sequence, the predicted sequence being in accordance with addresses selected by a branch processing unit. The logic unit 208 also decodes the instructions and dispatches them to an appropriate functional unit (e.g., execution unit) 212.0, . . . 212.n-1. In executing the instructions, the functional units 212 input and output information to and from registers (shown collectively as register file 216). The functional units 212 signal the completion unit 218, e.g., Instruction Completion Table, upon execution of instructions and the completion unit 218 retires the instructions. The processor may include a history buffer (not shown) to save a processor state before, for example, an interruptible instruction, so that if an interrupt occurs, control logic may recover the processor state to the interrupt point by restoring the content of registers. In an aspect, functional units 212 (e.g., execution units) also send results on one or more result buses (e.g. write back buses) 230 so that the results may be written to the register entries in the register file 216.

A CPU 110 may have multiple processing slices capable of executing multiple instructions simultaneously, for example, one instruction in each processing slice simultaneously in one processing cycle. Such a CPU having multiple processing slices may be referred to as a multi-slice processor or a parallel-slice processor. In an example, each processing slice may be an independent processor (e.g., processor 110) and may execute instructions independently of other processing slices in the multi-slice processor.

Figure 3:
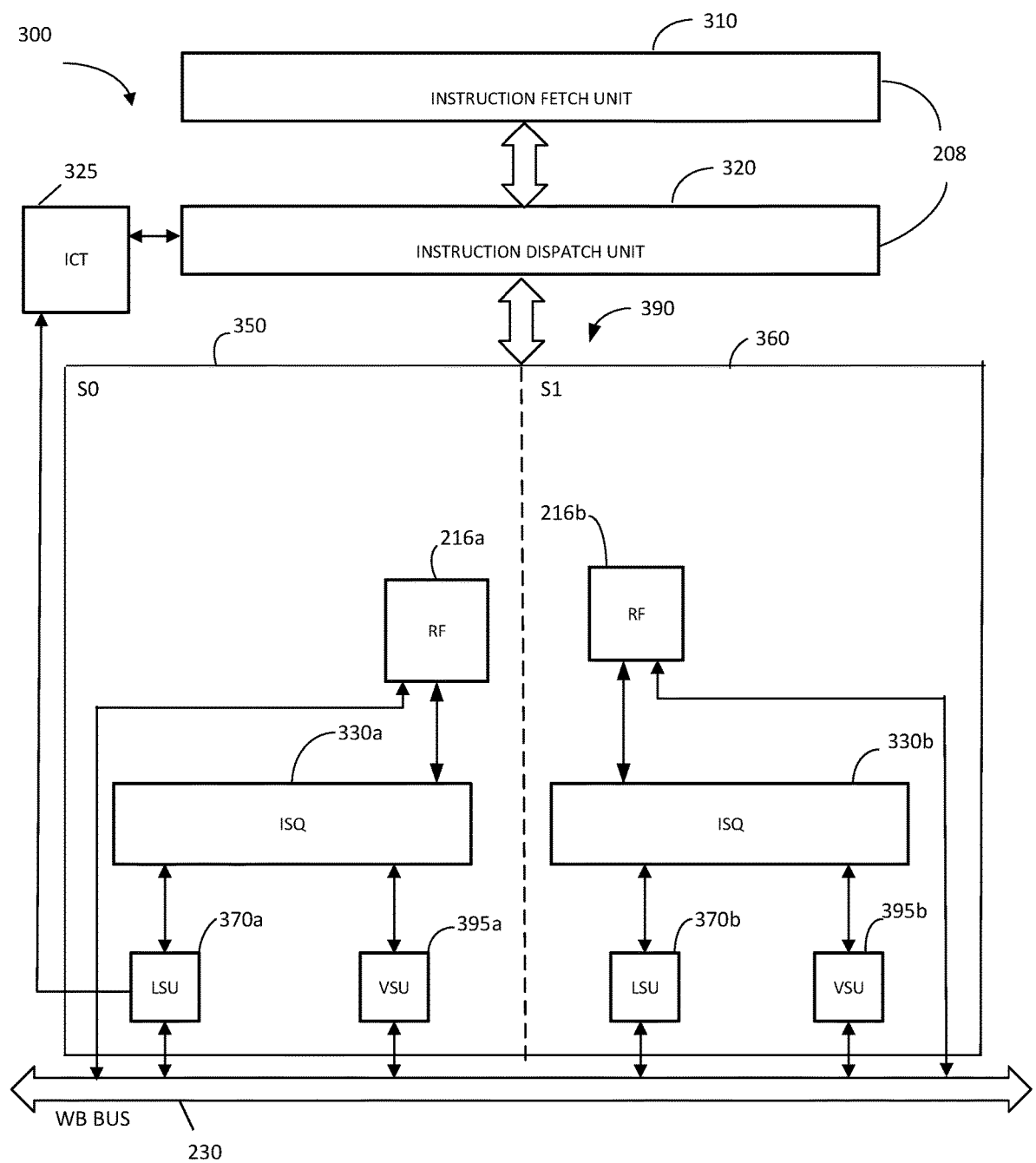
FIG. 3 illustrates a block diagram of a multi-slice processor in accordance with an aspect of the disclosure in which certain aspects of the present disclosure may be practiced.

FIG. 3 illustrates a diagram of a multi-slice processor 300 in accordance with an embodiment of the present disclosure. It may be noted that FIG. 3 only shows portions of the multi-slice processor 300 in diagrammatic fashion for purpose of discussion. It will be appreciated that the multi-slice processor may have other configurations. Processor 300 includes Instruction Fetch Unit 310, Instruction Dispatch Unit 320, Instruction Completion Table (ICT) 325, processing slices 350 and 360, and write back bus 230. As shown in FIG. 3, the multi-slice processor 300 in an embodiment includes two processing slices; even Slice 0 (slice S0 or 350) and odd Slice 1 (slice S1 or 360). Processor 300 may include more or less processing slices. Each of the slices 350 and 360, e.g., even processing slice S0 and odd processing slice S1, include an issue queue (ISQ) (330a and 330b), execution units 370 and 395, and a register file (RF) (216a and 216b). In the embodiment of FIG. 3, the execution units may include load store units (LSU) (370a and 370b), and vector scalar units (VSU) (395a and 395b). The execution units 370 and 395 may perform the operation specified by an instruction dispatched to execution slices 350 and 360. The register file 216a may serve to store data to be used in an operation specified in an instruction dispatched to execution slice 350, and the result of the operation performed by execution units 304a and 306a may be written to the designated target register in register file 216a. Execution units 370 and 395 are illustrated as LSU execution units and VSU execution units, but execution units may include, for example, one or more load store units (LSU), one or more vector scalar units (VSU), one or more arithmetic logic units (ALU), one or more fixed point units (FXU), one or more floating point units (FPU), one or more vector multimedia units (VMU), and/or one or more permutation units (PERM), as well as other functional and execution units. The processor core may include other circuits, functional units, and components.

As shown in FIG. 3, logic unit 208 may include instruction Fetch Unit 310 and instruction Dispatch Unit 320 to perform instruction fetch and dispatch for the multi-slice processor. At the designated time, the Dispatch Unit 320 may dispatch a given instruction to the designated instruction slice, e.g., slice 350 or slice 360. The designated execution slice 350 or 360 may then process the instruction. Once processed, the result of the instruction may be transferred through write back routing network (bus) 230, and written to registers within the register file 216.

In certain aspects, the ISQ 330 holds a set of instructions and the register file accumulates data for the instruction inputs. When an instruction is dispatched by instruction Dispatch Unit 320, the ISQ 330 may allocate a register file (RF) entry for the data. When all source data accumulates for the instruction, the data is passed on to one or more execution units designated for execution of the instruction. Each of the LSUs 370 and VSUs 395 may make result data available on the write back bus 230 for writing into an RF entry. It may be noted that two slices are shown for ease of illustration and discussion only, and that multi-slice processor 300 may include more than two processing or execution slices with each slice having all of the components discussed above, or alternative components for each of the slices S0 and S1 (slices 350 and 360). Further, the processing slices may be grouped into super slices (e.g., SS 390), with each super slice including a pair of processing slices. For example, a multi-slice processor may include two super slices SS0 and SS1, with SS0 including slices S0 and S1, and SS1 (not shown) including slices S2 and S3.

In certain aspects, the slices S0 and S1 of the multi-slice processor 300 may be configured to simultaneously execute independent threads (e.g., one thread per slice) in a simultaneous multi-threading mode (SMT). Thus, multiple threads may be simultaneously executed by the multi-slice processor 300. For example, in a multi thread mode, threads T0 and T1 may execute in SS0 and threads T2 and T3 may execute in SS1 (not shown). Further, in a single thread (ST) mode, instructions associated with a single thread may be executed simultaneously by the multiple processing slices of at least one super slice, for example, one instruction per slice simultaneously in one processing cycle. Simultaneous processing in multiple slices may considerably increase processing speed of the multi-slice processor 300.

Processor cores use various techniques for allocating resources dedicated to tracking load and store instructions within the load store execution unit (LSU) of the processor. In an embodiment, the load store unit (LSU) contains a store queue (STQ) of n entries of store instructions and contains a load queue (LDQ) of m entries of load instructions. The store queue (STQ) entries and the load queue (LDQ) entries are assigned (allocated) if the entries in the queues are available. Store queue (STQ) entries typically are freed up (deallocated) when the store instructions have executed and load queue (LDQ) entries typically are freed up (deallocated) when the loads have completed (retired).

Figure 4:
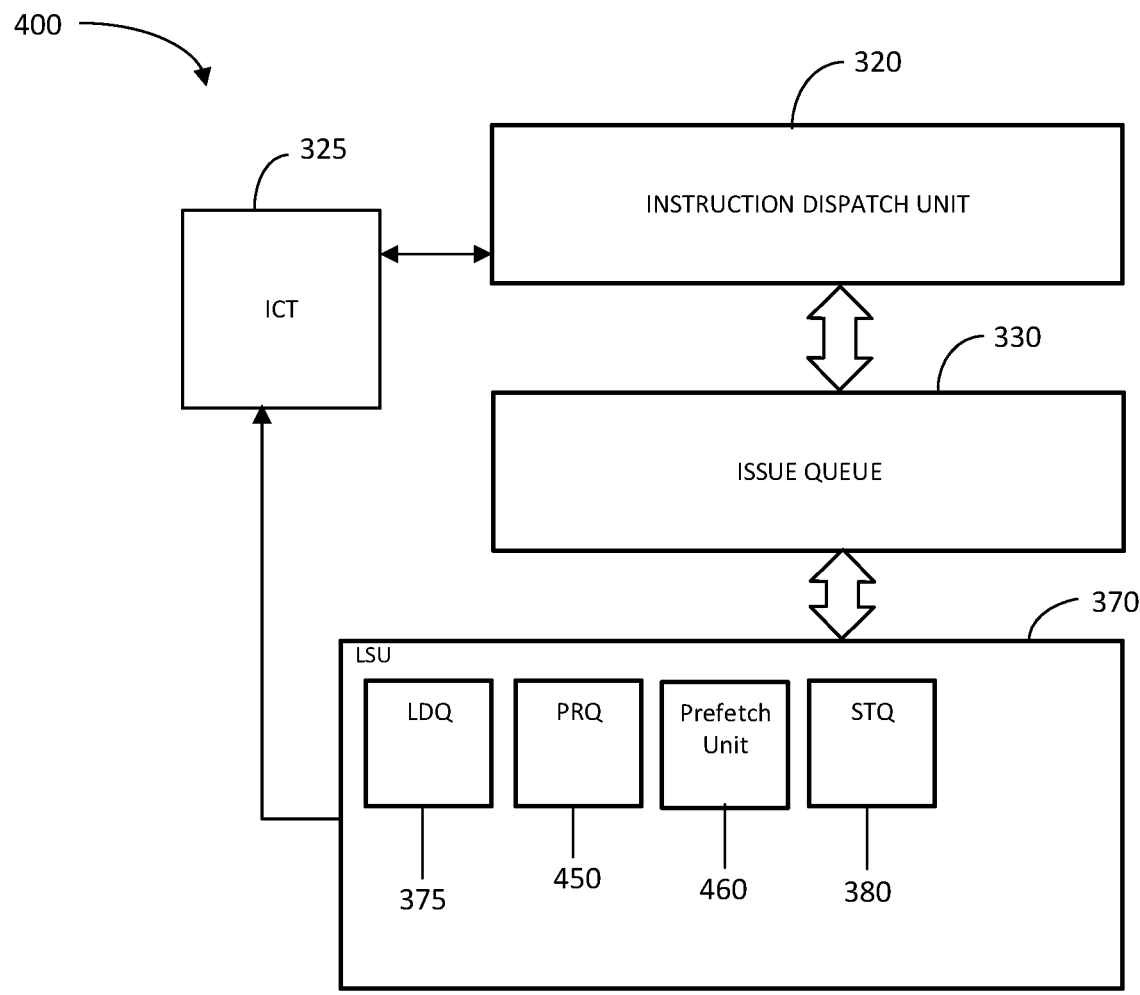
FIG. 4 illustrates portions of a processor in accordance within aspect of the present disclosure in which certain aspects of the present disclosure may be practiced.

FIG. 4 illustrates a portion of a processor pipeline. Processor pipeline 400 in FIG. 4 includes Instruction Dispatch Unit 320, Issue Queue (ISQ) 330, Instruction Completion Table (ICT) 325, and Load Store Unit (LSU) 370. The LSU 370 includes one or more load queues (LDQ) 375 that hold load instructions, and one or more store queues (STQ) 380 that hold store instructions. LSU 370 also includes a reorder queue, referred to as a prefetch reorder queue (PRQ) 450, that holds information on prefetch streams, e.g., the thread identification, the next expected address, and how far ahead the prefetch stream is from the instruction stream being executed in the functional units.

The Instruction Dispatch Unit 320 dispatches instructions to the Issue Queue (ISQ) 330, typically in program order. The Issue Queue (ISQ) 330 will issue load and store instructions to the LSU 370, and more particularly will issue load instructions to the load queue (LDQ) 375 and store instructions to the store queue (STQ) 380 in the LSU 370. For out-of-order processors, the Issue Queue (ISQ) typically issues instructions, e.g., load and store instructions, to the execution unit, e.g., LSU 370, out of order so instructions where the required data is available can be executed.

As indicated above, ISQ 330 typically does not issue an instruction to an execution unit until the data associated with the instruction is available. Where the data corresponding to, e.g., required by, an instruction is in main memory or a higher order cache, delay in fetching the data can result, which will slow processor speeds and decrease efficiency. To reduce, alleviate, and/or override the delay associated with memory retrieval, i.e., reduce the negative performance impact of memory latencies, the processor may implement a prefetch mechanism or engine. The prefetch mechanism or engine, usually part of a prefetch unit 460 (also referred to as prefetcher 460) that has circuits for processing information and performing logic operations, may be designed into an execution unit, e.g., LSU, and should have the ability to recognize and follow address patterns in a data or instruction stream, e.g., sequentially increasing or decreasing accesses to adjacent cachelines, and then request the data at anticipated addresses or cachelines from more distant levels of the cache/memory hierarchy. The usefulness of prefetching the cachelines (data) is reinforced as repeated prefetches are successfully made along such a stream or path. The depth of the prefetch, i.e., the number of prefetch requests or cachelines that the prefetch stream is ahead of an instruction stream, is increased or ramped up as the prefetch unit successfully recognizes that the next entry (cacheline) was accessed by the instruction stream, until enough cachelines (data) are brought into L1, L2 and/or L3 cache to hide or alleviate the latency associated with retrieving cachelines (data) from memory. The prefetch unit preferably brings the most urgently required cachelines (data) into the nearest cache levels.

The prefetch unit 460 tracks load and store addresses as they are accessed by the program via the prefetch reorder queue (PRQ) 450 (illustrated in FIG. 4) in the LSU 370. Loads that miss the cache, e.g., the L1 data cache, and which do not appear to be part of an existing stream that the PRQ is already tracking, are eligible for consideration to be added to the PRQ 450 as a potential new stream to track. This process is referred to as allocating, i.e., starting, a new stream. When streams are allocated, the address of the next predicted cacheline (address) in the stream, e.g., data or instruction stream, is written into the PRQ. Once a stream has been allocated, subsequent loads and stores that match the next predicted address in the stream, i.e., when there is a hit, are said to confirm the stream. Confirmation of the predicted address will result in an update to the PRQ for that entry and the entry will be updated to the address of the next predicted (expected) cacheline in the stream.

Once a path has been identified and a prefetch stream allocated and established, the prefetch unit 460 will begin making cache prefetch requests by inserting the cache prefetch address into the data/instruction flow of one of the execution unit's pipes, e.g. the LSU's pipe. The prefetch engine may generate different types of prefetch requests. For example, L1 prefetches are intended to bring data into the L1 data cache, L2 prefetches are intended to bring data into the L2 data cache, and L3 prefetches are intended to bring data into the L3 data cache. If the cache already has the requested data, the prefetch instruction is disregarded, and cancelled.

For prefetch instructions where the data is not in the required cache, prefetch tracking and execution may in an embodiment follow the request until the data has successfully made it into the load queue (LDQ) in the execution unit, and in another embodiment the prefetch request will bypass the load queue (LDQ) and be sent to the memory subsystem to retrieve the requested data and in an aspect may only indicate to the memory subsystem where the data should be sent. It is contemplated that prefetch tracking and execution may follow other processes as well.

Once a new prefetch stream allocates and is being tracked by the prefetch unit 460, the number of prefetched addresses, e.g. cachelines/instructions, that the prefetch unit 460 looks ahead (i.e. the prefetch depth) can be varied. To decrease latency a prefetch unit 460 is designed to stay ahead of the instructions and operations being executed in order to provide time for the data to arrive in proximity to and preferably ahead of the time that the instruction is ready to be executed. That is, it is desirable to send out the prefetch requests well before the data will be required to be used.

Generally, the prefetch unit 460 will ramp up, i.e., increase the number of cacheline/address accesses ahead it requests, based upon the number of successive confirms, i.e., successfully predicted hits. For example, during the ramp up phase, each successful prediction, i.e., confirm, triggers a request for multiple cachelines, e.g., three prefetch requests. For example, an initial prefetch stream allocate will cause a request for the next expected cacheline/address (entry X) to be brought into cache, and a subsequent look up for the next cacheline that confirms the newly allocated entry X (cacheline) will trigger an update to the existing PRQ entry, which will now point to cacheline X+1. In addition, the confirm will trigger a request for cachelines X+1, X+2, X+3 and X+4 to be brought into cache. Upon the next confirm of cacheline X+1, the PRQ entry is again updated, this time to point to cacheline X+2 as the next expected address, and this confirm triggers requests for cachelines X+5, X+6, X+7 and X+8 to be brought into cache. The number of prefetch requests ahead the prefetcher operates at can be varied, and how quickly the prefetch unit 460 ramps up can also be varied depending upon desired goals. Once the prefetch unit 460 is prefetching the desired number of cachelines (addresses) ahead of the current demand load (i.e., reached the maximum prefetch depth) and has reached a steady state, subsequent confirms will not cause the prefetch unit 460 (prefetch engine) to go further ahead. That is, once steady state had been achieved, and the prefetch stream is no longer ramping up, each subsequent confirm will trigger a request for one additional cacheline to be brought into cache.

Prefetching requires the ability to recognize and follow address patterns in a data or instruction stream. Some application patterns are very amenable to prefetching (for example, assessing every address sequentially), and some are not very amenable to prefetching (for example, random address patterns). When it comes to data prefetching in out-of-order processors, patterns which are theoretically strong candidates for hardware prefetching may sometimes be difficult to correctly predict and track. For an out-of-order processor, the load or store addresses might be sequential in program order, but the load and store instructions may not be executed in sequential order. As the prefetch unit typically only sees the execution order of the data/instruction stream, the non-sequential addresses make it difficult to catch onto the stream. Not only will it be difficult to catch onto and retain (maintain) the stream, but out-of-order access to addresses (cachelines, data) may cause a new prefetch stream to allocate that competes with the already established prefetch stream. Moreover, since a new prefetch stream may take a significant amount of time to ramp up, creating competing streams can reduce the effectiveness of the prefetch unit.

To sustain a prefetch stream, and reduce the number of competing allocated prefetch streams, in one or more embodiments, a prefetch protection bubble and/or safe zone is placed around a plurality of cachelines in proximity, e.g., adjacent, to the next expected cacheline (address). For example, the protection bubble/safety zone covers only a predetermined number, for example, eight, cachelines, or a variable amount of cachelines (addresses) where the purpose or function of the protection bubble and/or safety zone feature is in part to reduce, alleviate, and/or prevent competing prefetch streams from being created. Blocking or avoiding a new stream from allocating also avoids the necessity of a new ramp-up each time a new prefetch stream is created, and avoiding a new prefetch stream can facilitate the prefetch unit retrieving cachelines back to the core sooner. An additional or alternative purpose or function of the protection bubble and or safety zone feature is in part to continue following (i.e., maintaining) a prefetch stream even if there is a misprediction of the next expected address, e.g., where the next address is only out of order by, for example, two or three cachelines from the next expected address.

By placing a protection bubble and/or safe zone around the next expected address for a prefetch stream and other addresses surrounding the next expected address, confirms (accesses) that advance the stream can be expanded to a couple of addresses (cachelines) ahead of the expected address, and a section or zone of addresses (cachelines) can be blocked from new prefetch stream allocation. By reserving some addresses (not just the next expected address) in the protection bubble and/or safety zone for prefetch confirms, the ability to continue following a stream is maintained even if the access actually seen was slightly ahead of the access expected. In an embodiment the number of cachelines where the protection bubble prevents new prefetch streams from allocating is larger than the number of cachelines where the safety zone confirms or sustains and maintains the ability to continue following an allocated prefetch stream.

Figure 5:
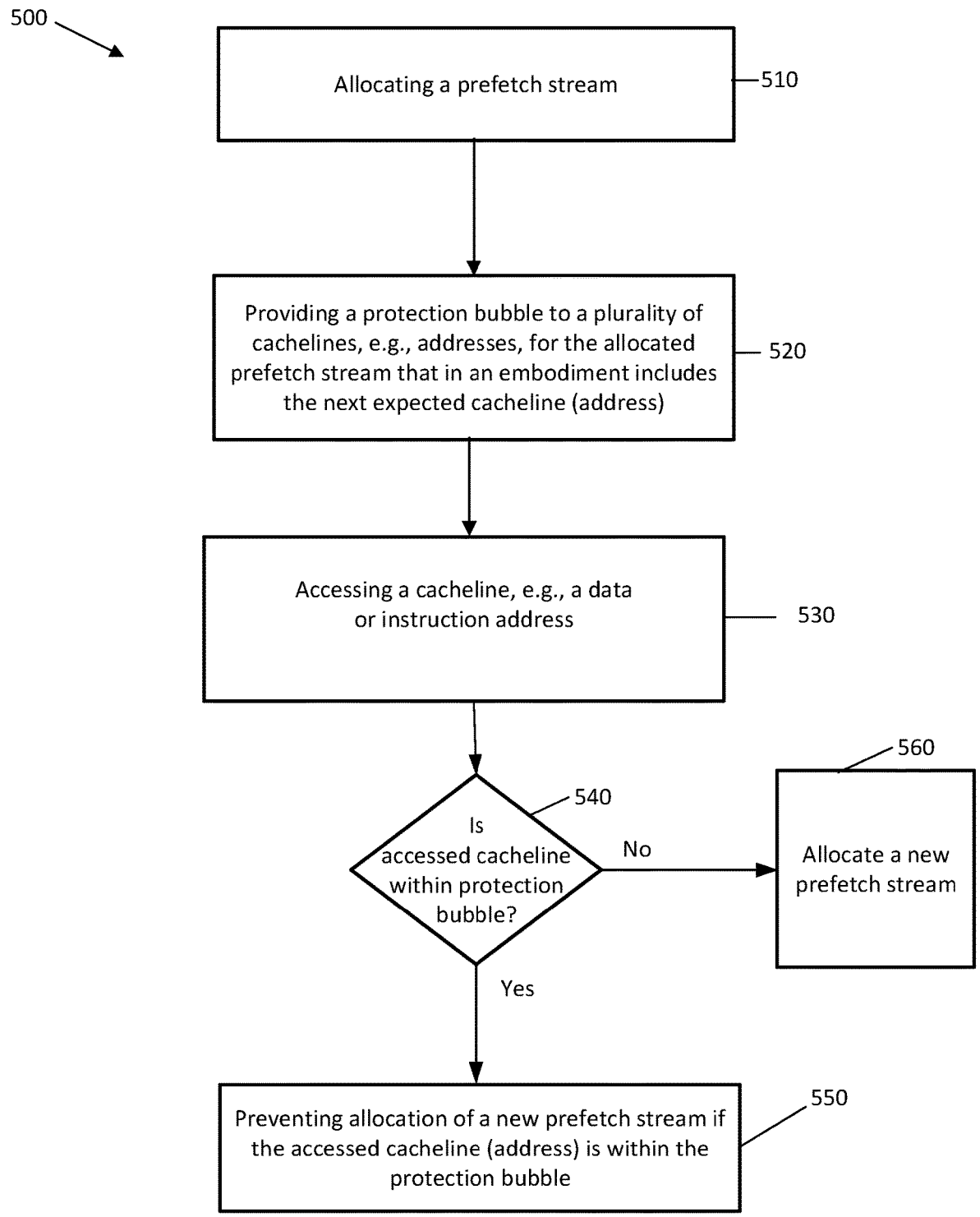
FIG. 5 is a flow diagram of a method of increasing the efficiency of a prefetch unit in a processor according to an embodiment of the disclosure.

FIG. 5 is an exemplary flowchart in accordance with an embodiment illustrating and describing a method of increasing the efficiency of a prefetch unit in an information handling system, and more specifically a method of reducing the instances or circumstances under which a prefetch unit allocates a new prefetch stream in a processor, in accordance with an embodiment of the present disclosure. While the method 500 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 5, but the process may be integrated and/or one or more steps may be performed together, simultaneously, or the steps may be performed in the order disclosed or in an alternate order.

A method 500 of handling instructions in an embodiment of a processor or information handling system, e.g., a computer system, is illustrated in FIG. 5, and more specifically a method to decrease latency in a processor by increasing the efficiency of a prefetch unit in a processor, and in an embodiment, a method of reducing and/or preventing allocation of a new undesired prefetch stream. At 510, a prefetch stream is allocated, preferably in a processor by a prefetch unit. The prefetch stream in an embodiment allocates when loads miss the L1 data cache. In an embodiment, the initial miss to a cacheline (address) will trigger a prefetch stream to allocate, which in an embodiment will cause a request for the next expected cacheline (address). Other criteria for allocating a prefetch stream, e.g., a data prefetch stream, are contemplated.

A protection bubble in an embodiment at 520 is implemented or provided to a plurality of cachelines for the allocated prefetch stream, which creates a region of cachelines (addresses). The plurality or region of cachelines in an aspect includes the next expected or predicted cacheline (address). The plurality of cachelines in the protection bubble in an embodiment includes a number of cachelines (addresses) in proximity to the next expected cacheline. It is contemplated in an embodiment that the allocated prefetch stream will be a data stream, e.g., data cachelines, and the plurality of cachelines in the protection bubble will be data cachelines. The plurality of cachelines in an example is eight (8) cachelines, including the next expected cacheline (address), but it is contemplated that the number of cachelines within the protection bubble may be more or less than eight cachelines (addresses).

In an embodiment, at 530, a cacheline (address), e.g., data or instruction address, is accessed. For example, the next cacheline (address) in the instruction or data stream is accessed. More specifically, in an aspect, data of the next instruction in the instruction stream is accessed. In an embodiment, a data access of a specified instruction stream is performed.

At 540, in an embodiment, it is determined whether or not the accessed cacheline, e.g., the accessed data or instructions, is within the protection bubble. For example, a comparison could be employed between the accessed cacheline (address), and the cachelines (addresses) within the protection bubble. At 550, if the accessed cacheline is within the cachelines included within the protection bubble (540: Yes), then allocation of a new prefetch stream is prevented. That is, allocation of a different, e.g., new, prefetch stream is prevented if a data or instruction access is within the plurality of cachelines included within, covered by, or protected by, the protection bubble. For example, in an embodiment, if the accessed cacheline is not a hit, i.e., not the predicted or expected next cacheline (address), but is one of the plurality of cachelines within the protection bubble, the prefetch unit will not allocate a new prefetch stream. In an embodiment, if a data access of a specified instruction stream is within the plurality of cachelines included within, covered by, or protected by the protection bubble, then a new prefetch stream is prevented from allocating. Rather, in an embodiment, the prefetch unit will maintain and sustain the prefetch stream, and in an aspect will remain on the next expected address for that allocated prefetch instruction stream.

However, in an embodiment, if the accessed cacheline e.g., the data or instruction address accessed, is outside the protection bubble, (540: No), then the prefetch unit may, and in an embodiment at 560 will, allocate or start a new prefetch stream.

Figure 6:
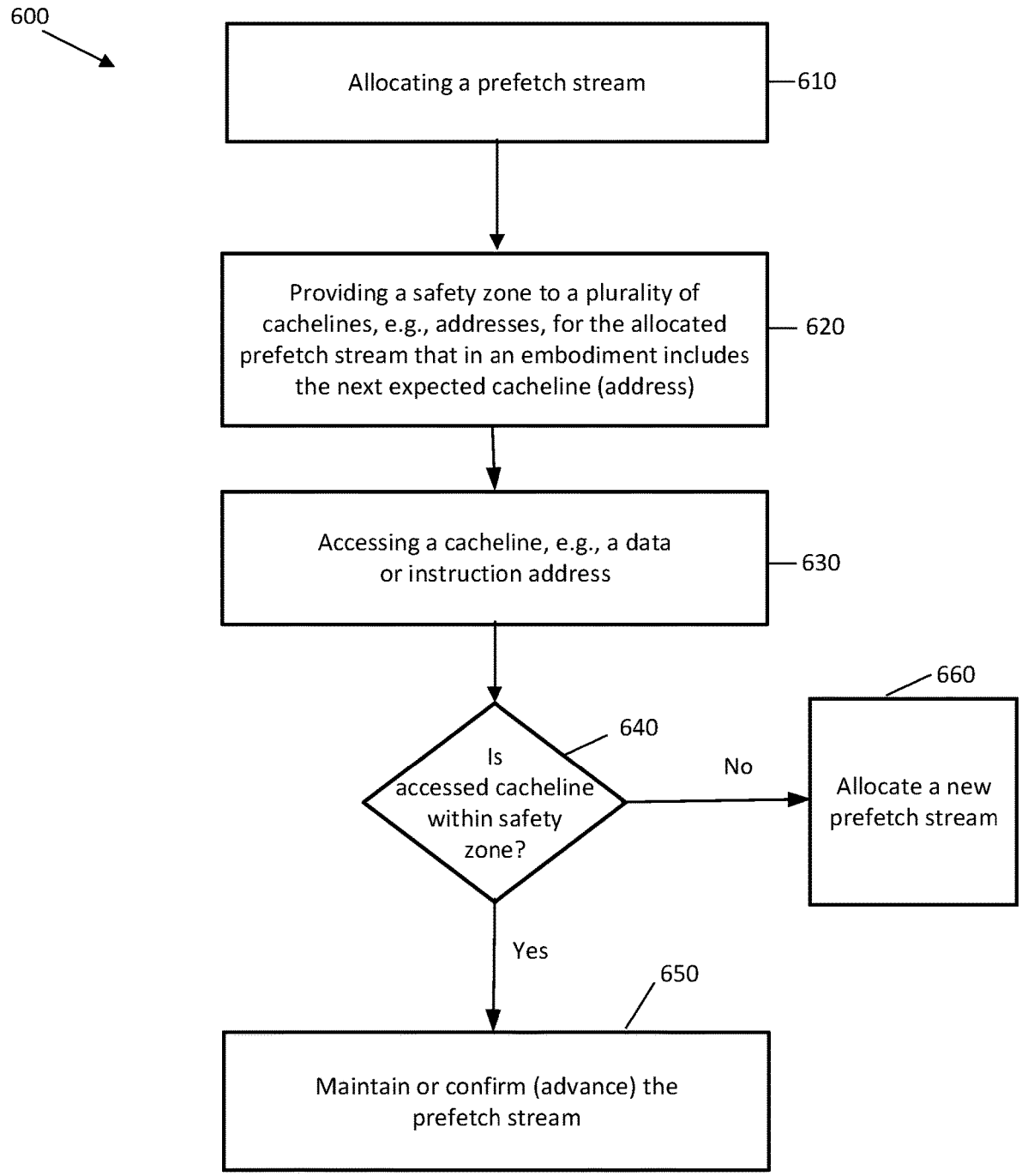
FIG. 6 is a flow diagram of a method of increasing the efficiency of a prefetch unit in a processor according to another embodiment of the disclosure.

FIG. 6 is an exemplary flowchart in accordance with an embodiment illustrating and describing a method of increasing the efficiency of a prefetch unit in a processor and/or in an information handling system, e.g., a computer system, and more specifically a method of sustaining and/or advancing a prefetch stream in a prefetch unit in a processor, in accordance with an embodiment of the present disclosure. While the method 600 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 6, but the process may be integrated and/or one or more steps may be performed together, simultaneously, or the steps may be performed in the order disclosed or in an alternate order.

A method 600 of handling instructions in an embodiment of a processor or information handling system, e.g., a computer system, is illustrated in FIG. 6, and more specifically a method to decrease latency in a processor by increasing the efficiency of a prefetch unit in a processor, and in an embodiment, a method of maintaining and/or sustaining an allocated prefetch stream. At 610, a prefetch stream is allocated, preferably in a processor by a prefetch unit. The prefetch stream in an embodiment allocates when loads miss the L1 data cache. In an embodiment, the initial miss to a cacheline (address) will trigger a prefetch stream to allocate, which will cause a request for the next cacheline (address). Other criteria for allocating a prefetch stream, e.g., a data prefetch stream, are contemplated.

A safety zone in an embodiment is provided at 620 to a plurality of cachelines for the allocated prefetch stream, which creates a zone of cachelines (e.g., addresses). The plurality of cachelines in the zone in an aspect includes the next expected or predicted cacheline (address). The plurality of cachelines in the safety zone in an embodiment includes a number of cachelines (addresses) in proximity to the next expected cacheline, and more specifically a number of cachelines in proximity to and preferably ahead of the next expected address (cacheline). It is contemplated in an embodiment that the allocated prefetch stream will be a data stream, e.g., data cachelines, and the plurality of cachelines in the safety zone will be data cachelines. The plurality of cachelines in the safety zone in an example is two (2) cachelines ahead of the next expected cacheline (address), in addition to the next expected cacheline (address) itself, but it is contemplated that the number of cachelines in the safety zone may be more or less than three, i.e, more or less than two cachelines plus the next expected cacheline.

In an embodiment, at 630, a cacheline (address), e.g., a data or instruction address, is accessed. For example, the next cacheline (address) in the data or instruction stream is accessed. More specifically, in an aspect, data of the next instruction in the instruction stream is accessed. In an embodiment, a data access of a specified instruction stream is performed.

At 640, in an embodiment, it is determined whether the accessed cacheline, e.g., data or instruction address, is within the safety zone. For example, a comparison could be employed between the accessed cacheline and the plurality of cachelines in the safety zone. If the accessed cacheline, e.g., data or instruction access, is within the plurality of cachelines included within, covered by, or protected by, the safety zone (640: Yes), then at 650 the prefetch stream is maintained. In an aspect, if the accessed cacheline is within the plurality of cachelines in the safety zone (640: Yes), then the prefetch stream is confirmed, i.e., advanced. For example, in an embodiment, if the accessed cacheline is not a hit, i.e., not the predicted or expected next cacheline (address), but is one of the plurality of cachelines within the safety zone, the prefetch unit at 650 will maintain and sustain the allocated prefetch stream. And, in an embodiment, at 650 the prefetch unit will confirm and advance the allocated prefetch stream. In an aspect, the prefetch unit will continue to follow the prefetch stream even if a cacheline access was different then the expected or predicted cacheline. That is, in an aspect, if the accessed cacheline is within the safety zone the prefetch stream will remain active and keeps going as expected, and in an aspect will continue to ramp up. prefetch stream will remain active and keeps going as expected, and in an aspect will continue to ramp up.

However, in an embodiment, if the cacheline (address) access, e.g., data or instruction access, is outside the safety zone (640: No), then the prefetch unit will not sustain, or advance, the allocated prefetch stream, and in an embodiment may allocate, and in an aspect at 660 will allocate, a new prefetch stream.

Figure 7:
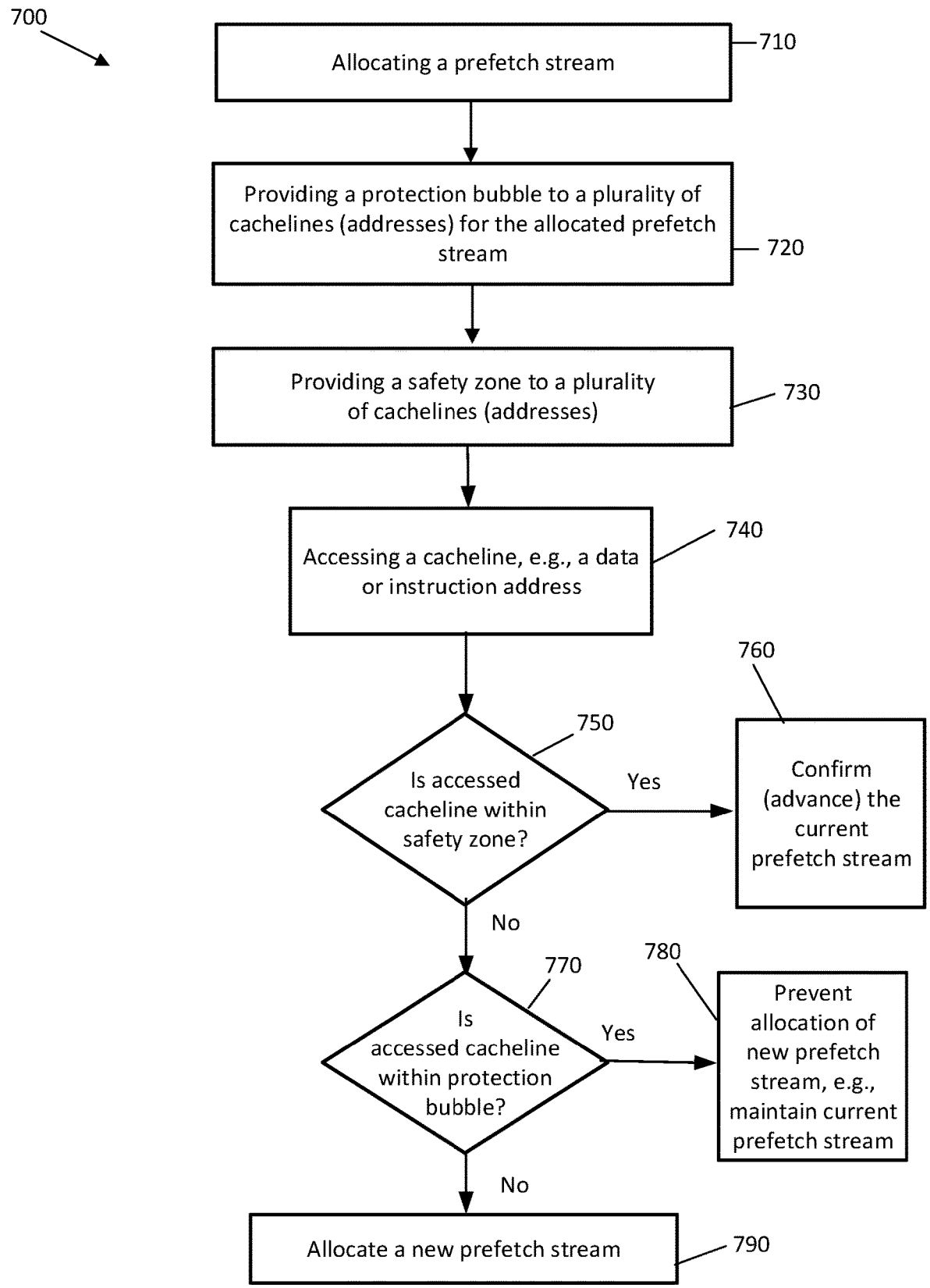
FIG. 7 is a flow diagram of a method of increasing the efficiency of a prefetch unit in a processor according to a further embodiment of the disclosure.

FIG. 7 is an exemplary flowchart in accordance with an embodiment illustrating and describing a method of increasing the efficiency of a prefetch unit in a processor and/or an information handling system, e.g., a computer system, and more specifically a method of reducing the instances or circumstances a prefetch unit allocates new prefetch streams in a processor, and a method of maintaining, sustaining, and/or advancing an allocated prefetch stream in accordance with an embodiment of the present disclosure. While the method 700 is described for the sake of convenience and not with an intent of limiting the disclosure as comprising a series and/or a number of steps, it is to be understood that the process does not need to be performed as a series of steps and/or the steps do not need to be performed in the order shown and described with respect to FIG. 7, but the process may be integrated and/or one or more steps may be performed together, simultaneously, or the steps may be performed in the order disclosed or in an alternate order.

A method 700 of handling instructions in an embodiment of a processor and/or information handling system, e.g., a computer system, is illustrated in FIG. 7, and more specifically a method to decrease latency in a processor by increasing the efficiency of a prefetch unit in a processor, and in an embodiment, a method of reducing and/or preventing allocation of a new undesired prefetch stream, a method of sustaining and maintaining an allocated prefetch stream, and/or a method of confirming and advancing a prefetch stream. At 710, a prefetch stream is allocated, preferably in a processor by a prefetch unit. The prefetch stream in an embodiment allocates when loads miss the L1 data cache. In an embodiment, the initial miss to a cacheline (address) will trigger a prefetch stream to allocate, which will cause a request for the next cacheline (address). Other criteria for allocating a prefetch stream, e.g., a data prefetch stream, are contemplated.

A protection bubble in an embodiment is provided at 720 to a plurality of cachelines for the allocated prefetch stream, which creates a region of cachelines (e.g., addresses). The region or plurality of cachelines in the protection bubble, in an aspect, includes the next expected or predicted cacheline (address). The plurality of cachelines in the protection bubble in an embodiment includes a number of cachelines (addresses) in proximity to the next expected cacheline, and in an embodiment includes at least the cachelines adjacent to the next expected cacheline. It is contemplated in an embodiment that the allocated prefetch stream will be a data stream, e.g., data cachelines, and the cachelines in the protection bubble will be data cachelines. The plurality of cachelines in an example is eight (8) cachelines, including the next expected cacheline (address), but it is contemplated that the number of cachelines within the protection bubble may be more or less than eight cachelines (addresses).

A safety zone, in an embodiment, is provided at 730 to a plurality of cachelines for the allocated prefetch stream, which creates a zone of cachelines (e.g., addresses). The plurality of cachelines in the zone in an aspect includes the next predicted or expected cacheline (address). The plurality of cachelines in the safety zone in an embodiment includes a number of cachelines (addresses) in proximity to the next expected cacheline. In an example, the safety zone includes a number of cachelines (addresses) ahead of the next expected address (cacheline). It is contemplated in an embodiment that the allocated prefetch stream will be a data stream, e.g., data cachelines, and the plurality of cachelines in the safety zone will be data cachelines. The plurality of cachelines in an example is three (3) cachelines; for example, two (2) cachelines ahead of the next expected cacheline (address), in addition to the next expected cacheline (address) itself. It is contemplated that the number of cachelines in the safety zone may be more or less than three, i.e., more or less than two cachelines plus the next expected cacheline.

In an embodiment, at 740, a cacheline (address), e.g., a data or instruction address, is accessed. In an embodiment, the next cacheline in the instruction or data stream is accessed, and more specifically in an aspect, data of the next instruction in the instruction stream is accessed. In a further embodiment, a data access of a specified instruction stream is performed.

At 750, in an embodiment, it is determined if the accessed cacheline (address), e.g., data or instruction address, is within the plurality of cachelines included within, covered by, or protected by, the safety zone. In an embodiment, at 750, it is determined whether data within a specified instruction stream is within the safety zone. For example, a comparison could be employed between the accessed cacheline and the plurality of cachelines in the safety zone. If the accessed cacheline, e.g., data or instruction address, is within, covered by, or protected by the safety zone (750: Yes), then at 760 the prefetch stream is confirmed, e.g., advanced. For example, in an embodiment, if the accessed cacheline, e.g., the next data or instruction address, is not a hit, i.e., not the predicted next cacheline (address), but is one of the plurality of cachelines within the safety zone, then the prefetch unit will confirm, i.e., advance, the allocated prefetch stream. In an embodiment, if the accessed cacheline in the instruction stream is a hit, i.e., is the predicted next cacheline (address), then the allocated prefetch stream is also confirmed, i.e., advanced, preferably by the prefetch unit. In an embodiment, the prefetch unit will continue to follow the allocated prefetch stream even if a cacheline access was different than the expected or predicted cacheline. That is, in an aspect, if the accessed cacheline, e.g., data or instruction address, is within the cachelines covered by the safety zone, then the prefetch unit will remain active and keeps the current prefetch stream going as expected, and in an aspect, will continue to ramp up the current prefetch stream. In an embodiment, the prefetch unit will maintain and sustain the allocated prefetch stream if the accessed cacheline is within the plurality of cachelines (addresses) within the safety zone, and will not allocate a new, different prefetch stream.

If the accessed cacheline, e.g., accessed data or instruction address, is not within the safety zone (750: No), then in an aspect, at 770, it will be determined whether the accessed cacheline, e.g., the next data or instruction address, is within the protection bubble. For example, a comparison could be employed between the accessed cacheline and the plurality of cachelines in the protection bubble. In an embodiment at 770, it will be determined whether data within a specified instruction stream is within, covered by, or protected by the protection bubble.

In an embodiment if the accessed cacheline (address), e.g., the data or instruction address accessed, is within the plurality of cachelines included within, covered by, or protected by, the protection bubble (770: Yes), then at 780, allocation of a new prefetch stream is prevented. In an embodiment, if data within a specified instruction stream is within the protection bubble, then at 780, allocation of a new prefetch stream is prevented. For example, in an embodiment, if the accessed cacheline (address), e.g., accessed data or instruction address, is not a hit, i.e., not the predicted or expected cacheline (address), but is one of the plurality of cachelines within the protection bubble, the prefetch unit will not allocate a new prefetch stream. In an embodiment, if a data access of a specified instruction stream is within the plurality of cachelines included within or covered by the protection bubble, then a new prefetch stream is prevented from allocating. Rather, in an embodiment, the prefetch unit will remain on the next expected address for that allocated prefetch stream.

However, in an embodiment, if the accessed cacheline in the instruction stream is outside the protection bubble (770: No), then the prefetch unit may start (allocate), and in an embodiment at 790 will start (allocate), a new prefetch stream. In yet another aspect, where the accesses cacheline (address) is outside the safety zone and outside the protection bubble, the prefetch unit at 790 will allocate a new prefetch stream.

The prefetch bubble and/or safety zone is illustrated in FIGS. 8 and 9 where FIG. 8 illustrates a positive increasing instruction stream and FIG. 9 illustrates a negative, decreasing instruction stream. In FIGS. 8 and 9 the protection bubble covers eight (8) cachelines for a particular increasing or decreasing instruction stream, including the next expected address. Of these eight (8) cachelines, three (3) cachelines will be used for the safety zone to confirm (advance) the prefetch stream, and the remaining five (5) cachelines in the protection bubble will be blocked from allocation. The confirming addresses in an embodiment will always include the next expected address (X). In FIGS. 8 and 9, the next predicted or expected address is X, and the cacheline size is designated Y. Thus the address ahead of the next expected address is X+Y, and the address two ahead of the next expected address is X+2Y, etc. The address behind the next expected address is X−Y, and the address two behind the next expected address is X−2Y, etc.

The direction of a stream is always assumed to be increasing in magnitude (addresses increase over time). However, during stream start up, the prefetch unit (engine) in an embodiment will simultaneously examine streams for both increasing and decreasing patterns using a "shadow" queue. Subsequent references may either confirm the increasing direction or the decreasing direction. If the stream is confirmed by a decreasing pattern, then the direction of the stream will be marked as such from that point forward.

FIG. 8 shows the protection bubble for an increasing prefetch stream, while FIG. 9 shows the protection bubble for a decreasing prefetch stream. For a positive direction stream, the two confirming addresses beyond the next expected address will be X+cacheline_size and X+2*cacheline_size. For a negative direction stream, the two confirming addresses (beyond the next expected address) will be X−cacheline_size and X−2*cacheline_size. In the example of FIGS. 8 and 9, The cachelines are 128 Bytes, the protection bubble covers 1024 Bytes, and the advancing safety zone covers 384 Bytes. Different size cachelines are contemplated, as well as different size safety zones, and different size protection bubbles.

In order to reduce the required comparison logic, the boundaries of the protection bubble may be designed to always fall on a multiple of four (thereby removing the final two cacheline determining bits). If the next expected cacheline is in the first or second position of its group of four (last two cacheline determining bits 00 or 01), the bubble will include its own group of four cachelines, and the group of four cachelines behind it. If a cacheline is in the third or fourth position in its group of four (last two cacheline determining bits 10 or 11), the bubble will include its own group of four cachelines and the group of four cachelines in front of it. This grouping of cachelines is illustrated in FIGS. 8 and 9.

While the illustrative embodiments described above are preferably implemented in hardware, such as in units and circuitry of a processor, for example circuits on a single chip, various aspects of the illustrative embodiments may be implemented in software as well. For example, it will be understood that each block of the flowchart illustration in FIGS. 5-7 can be implemented in hardware, and combinations of blocks in the flowchart illustrations can be implemented in hardware, but that each block and combinations of blocks can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

In one or more embodiments a computer system for processing information is disclosed, and in an embodiment the computer system includes at least one processor; a Prefetch Unit for prefetching cachelines (addresses); one or more computer readable non-transitory storage media; and programming instructions stored on the one or more computer readable non-transitory storage media for execution by at least one processor. The programming instructions in an aspect preferably include programming instructions to allocate a prefetch stream; programming instructions to provide a protection bubble to a plurality of cachelines (addresses) for the allocated prefetch stream; programming instructions to access a cacheline; and programming instructions to prevent allocation of a second new prefetch stream in response to an accessed cacheline (address) being within the plurality of cachelines (addresses) within the protection bubble.

In an embodiment, the computer system further includes programming instructions to provide a safety zone to a number of cachelines (addresses) for the allocated prefetch stream, and programming instructions to advance the allocated prefetch stream to the next expected cacheline (address) in response to the accessed cacheline being within the plurality of cachelines (addresses) within the safety zone. In an aspect, the number of cachelines (addresses) within the protection bubble is larger than the number of cachelines (addresses) within the safety zone. In a further implementation, the cashelines (addresses) within the safety zone include the next expected cacheline (address) and a number of cachelines (addresses) ahead of the next expected cacheline (address0, and the plurality of cachelines (addresses) within the protection bubble includes the cachelines (addresses) within the safety zone and a plurality of additional cachelines (addresses) in proximity of the next expected cacheline (address), and the system further includes programming instructions to stay on the next expected cacheline (address) in response to the accessed cacheline (address) being within the protection bubble, but not within the safety zone; and the system further includes programming instructions to allocate a second, new prefetch stream in response to the accessed cacheline (address) not being within the safety zone, and not being within the protection bubble.

Accordingly, blocks of the flowchart illustration support combinations of means for performing the specified functions, combinations of steps for performing the specified functions and program instruction means for performing the specified functions. It will also be understood that each block of the flowchart illustration, and combinations of blocks in the flowchart illustration, can be implemented by special purpose hardware-based computer systems which perform the specified functions or steps, or by combinations of special purpose hardware and computer instructions.

The processes, techniques, circuitry, and systems described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, functional unit, hardware, or portion of code, which comprises one or more circuits or executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method of processing data in a processor, comprising:
allocating a prefetch stream to request data at anticipated addresses from a cache memory hierarchy;
providing, in response to the allocated prefetch stream, a protection bubble to a plurality of cachelines that prevents allocation of a different prefetch stream, wherein the plurality of cachelines within the protection bubble includes a next expected cacheline and at least one additional cacheline;
accessing a cacheline; and
preventing, in response to the accessed cacheline being one of the plurality of cachelines within the protection bubble, allocation of a different prefetch stream.

2. The method of claim 1, further comprising remaining on the next expected cacheline in the allocated prefetch stream in response to the accessed cacheline being within the protection bubble.

3. The method of claim 1, comprising accessing data of a specified instruction stream, and preventing allocation of a new prefetch stream if the accessed data is one of the plurality of the cachelines within the protection bubble.

4. The method according to claim 1, wherein the protection bubble consists of a plurality of cachelines adjacent to the next expected cacheline in the prefetch stream.

5. The method according to claim 1, further comprising configuring one or more boundaries of the protection bubble to fall on a multiple of four.

6. The method according to claim 1, further comprising tracking the prefetch stream with a prefetch queue.

7. The method according to claim 1, wherein the allocated prefetch stream is allocated by a prefetcher having circuits to process information and perform logic operations, wherein the prefetcher is configured to ramp up to a maximum number of prefetch requests ahead of an instruction stream.

8. The method according to claim 1, further comprising providing a safety zone to a plurality of cachelines for the allocated prefetch stream wherein the safety zone permits advancement of the allocated prefetch stream in response to the accessed cacheline being one of the plurality of cachelines within the safety zone, and advancing the prefetch stream in response to the accessed cacheline being one of the plurality of cachelines in the safety zone.

9. The method according to claim 8, wherein the plurality of cachelines within the safety zone is less than the plurality of cachelines within the protection bubble.

10. The method according to claim 9, wherein the plurality of cachelines within the safety zone consists of three cachelines, including the next expected cacheline.

11. The method according to claim 8, further comprising not allocating a new prefetch stream and remaining on the next expected cacheline in the allocated prefetch stream in response to the accessed cacheline being one of the plurality of cachelines within the protection bubble but not one of the plurality of cachelines within the safety zone.

12. A method of increasing efficiency of a processor comprising:
allocating a new prefetch stream to request data at anticipated addresses from a cache memory hierarchy;
providing, in response to the allocated new prefetch stream, a safety zone to a plurality of cachelines that permits advancement of the allocated new prefetch stream, wherein the plurality of cachelines within the safety zone includes a next expected cacheline and at least one additional cacheline;
accessing a next cacheline; and
advancing the allocated new prefetch stream in response to the next accessed cacheline being one of the plurality of cachelines within the safety zone.

13. The method according to claim 12, wherein the plurality of cachelines within the safety zone includes a next expected cacheline, and two cachelines after the next expected cacheline.

14. The method according to claim 12, further comprising providing a protection bubble to a region of cachelines for the allocated new prefetch stream wherein the protection bubble prevents allocation of a different prefetch stream in response to a cacheline access not being the next expected cacheline but being one of the region of cachelines within the protection bubble, and preventing a new stream from allocating in response to the next accessed cacheline being within the region of cachelines.

15. The method according to claim 14, wherein the region of cachelines within the protection bubble includes cachelines in addition to the plurality of cachelines within the safety zone.

16. The method according to claim 15, further comprising keeping the allocated new prefetch stream on the next expected cacheline if the next accessed cacheline is within the region of cachelines within the protection bubble, but not within the plurality of cachelines within the safety zone.

17. A method according to claim 14, further comprising allocating a new, second prefetch stream in response to the next accessed cacheline (a) not being within the plurality of cachelines within the safety zone, and (b) not being within the region of cachelines within the protection bubble.

18. A computer system for processing information, the computer system comprising:
at least one processor having a prefetcher having circuits to process information and perform logic operations wherein the prefetcher is for prefetching cachelines, wherein the at least one processor is configured to:
allocate a prefetch stream;
provide, in response to the allocated prefetch stream, a protection bubble to a plurality of cachelines that prevents allocation of a new second prefetch stream, wherein the plurality of cachelines within the protection bubble includes a next expected cacheline and at least one additional cacheline;

access a cacheline; and prevent allocation of the new second prefetch stream in response to the accessed cacheline being one of the plurality of cachelines within the protection bubble.

19. The computer system of claim 18, wherein the at least one processor is further configured to provide, in response to the allocated prefetch stream, a safety zone to a number of cachelines that permits advancement of the allocated prefetch stream, wherein the number of cachelines within the safety zone includes the next expected cacheline and at least one additional cacheline, and to advance the allocated prefetch stream to the next expected cacheline in response to the accessed cacheline being one of the number of cachelines within the safety zone, and wherein the plurality of cachelines within the protection bubble is larger than the number of cachelines within the safety zone.

20. The computer system of claim 19, wherein the cachelines within the safety zone include the next expected cacheline and a number of cachelines after the next expected cacheline, and the plurality of cachelines within the protection bubble includes the cachelines within the safety zone and a plurality of additional cachelines adjacent the next expected cacheline, and the at least one processor is further configured to stay on the next expected cacheline in response to the accessed cacheline being within the protection bubble, but not within the safety zone; and allocate a second, new prefetch stream in response to the accessed cacheline not being within the safety zone, and not being within the protection bubble.

* * * * *